Figure 1:
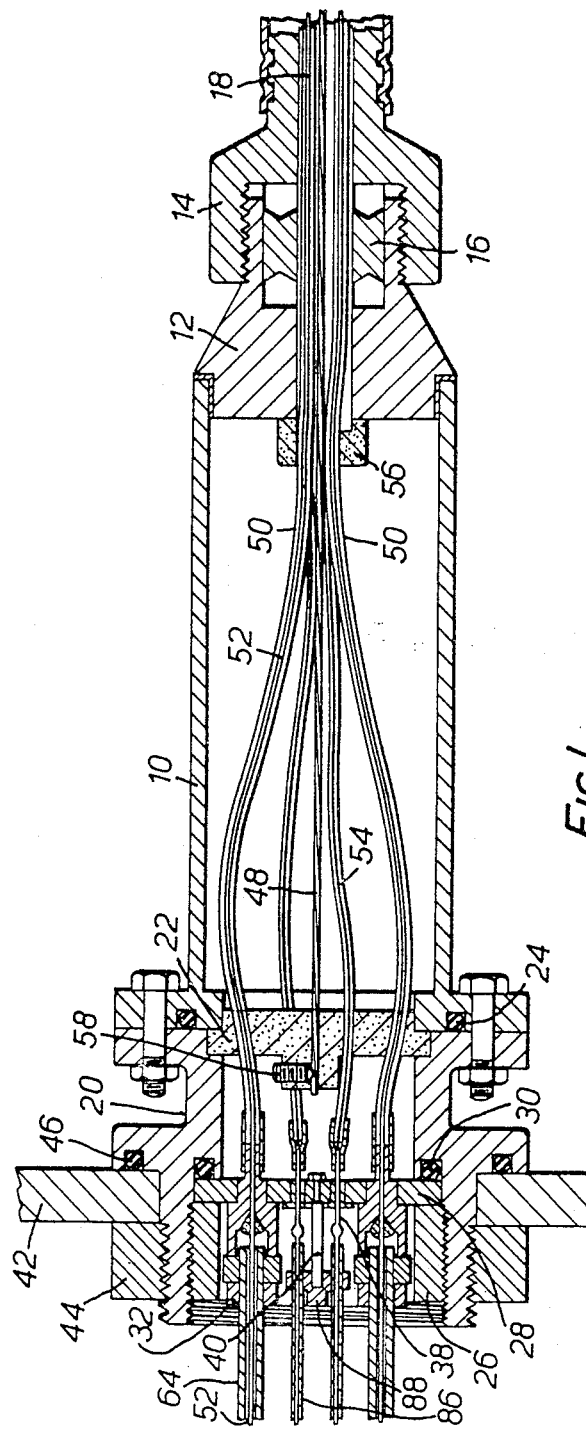

United States Patent [19]

Mead

[11] 4,312,563
[45] Jan. 26, 1982

[54] CONNECTORS FOR SEALED CONTAINERS

[75] Inventor: John F. Mead, Princes Risboro, England

[73] Assignee: Plessey Handel und Investments A.G., Zug, Switzerland

[21] Appl. No.: 122,481

[22] Filed: Feb. 19, 1980

[30] Foreign Application Priority Data

Feb. 27, 1979 [GB] United Kingdom ............... 06959/79

[51] Int. Cl.³ .............................................. G02B 7/26
[52] U.S. Cl. ................................................ 350/96.20
[58] Field of Search ............... 350/96.20, 96.21, 96.22, 350/96.23; 174/70 R, 70 S

[56] References Cited

U.S. PATENT DOCUMENTS 3,423,594 1/1969 Galopin ........................... 350/96.20
3,966,299 6/1976 Osterfield et al. ............... 350/96.21

FOREIGN PATENT DOCUMENTS 2504819 8/1976 Fed. Rep. of Germany ... 350/96.20
2648995 12/1977 Fed. Rep. of Germany ... 350/96.21

Primary Examiner—John D. Lee
Attorney, Agent, or Firm—Fleit & Jacobson

[57] ABSTRACT

A cable entry gland which will provide an effective seal at the end of a pressurized fibre optic cable so that the pressurization within the cable is not lost when the cable is removed from a repeater box consists of a housing sealed to the outer covering of the cable. The optical fibres extend through the housing and out through the end wall of the housing, suitable seals being provided between the optical fibres and the wall. A strain wire connects the cable to the end wall to prevent stresses passing to the fibres. It is possible to replace a broken fibre without dismantling the gland by drilling out the seal in the end wall, withdrawing the broken fibre, threading a new fibre through the gland and re-sealing the fibre to the wall.

5 Claims, 9 Drawing Figures

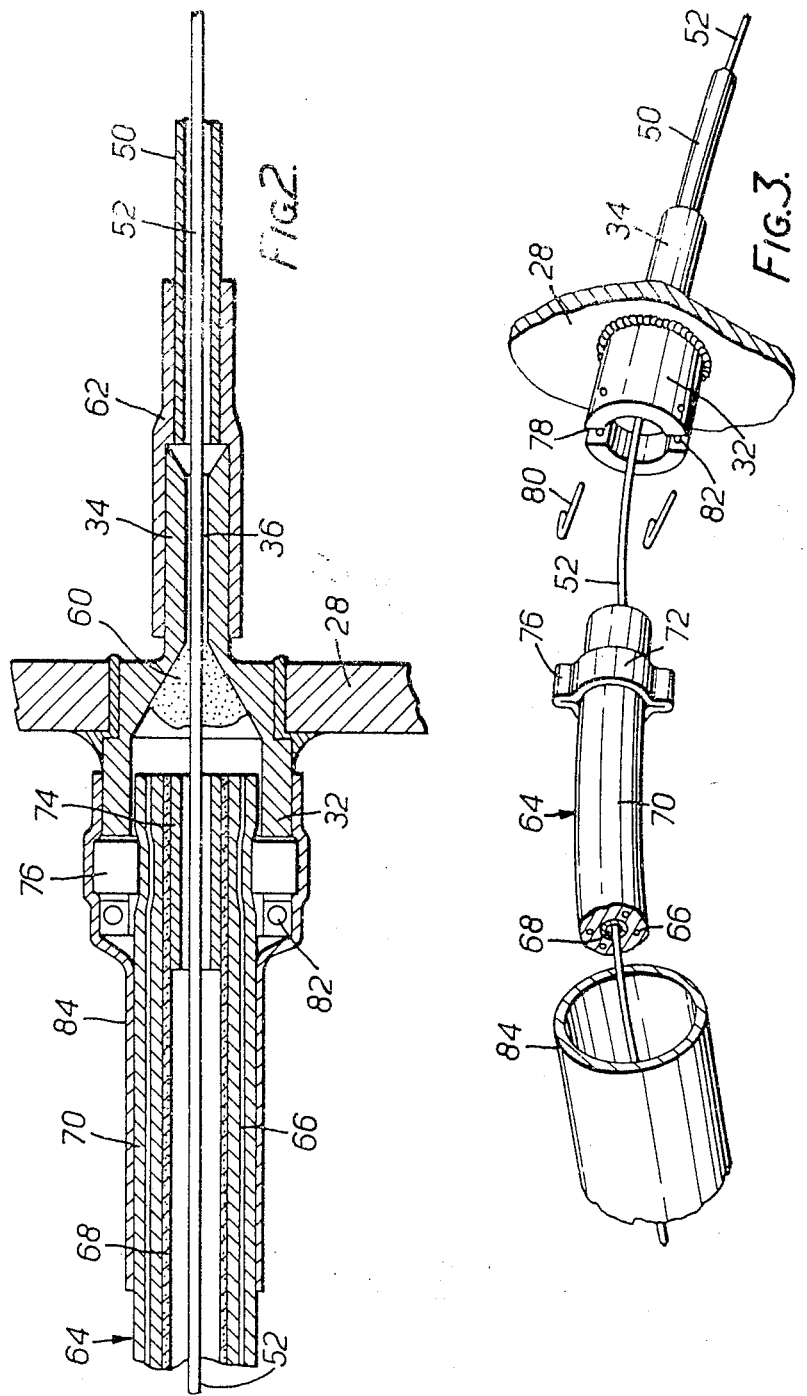

CONNECTORS FOR SEALED CONTAINERS

This invention relates to connectors for sealed containers and more particularly to connectors for sealed cables containing one or more optical fibres.

Such connectors are used in communication systems on the ends of underground cables where the electrical conductors enter a repeater box which is also usually mounted underground. The repeater box and the cable are usually pressurized to prevent the ingress of dirt, moisture, etc., and it is an object of the present invention to provide such a connector which will provide an effective seal at the end of a cable containing optical fibres so that the pressurization within the cable is not lost when the cable is removed from the repeater box or the pressure in the repeater box is inadvertently lost.

A further object of the invention is to provide a connector for a sealed cable containing one or more optical fibres in which the or each optical fibre can be replaced without the connector being completely dismantled.

According to an aspect of the present invention a connector for a sealed cable containing one or more optical fibres comprises a housing sealingly connected to the outer covering of the cable, the or each optical fibre extending through the housing and out through a wall thereof, means sealing the or each fibre with the wall whereby the cable and the housing are hermetically sealed, and strain means connecting the cable and the housing to prevent the or each optical fibre from being subjected to stress and/or strain within the housing.

Preferably further strain means are provided between the ends of the or each optical fibre and the wall.

Preferably the housing comprises an elongate cylindrical member which is secured to the cable at one end and is provided with a diaphragm at the other end through which the or each optical fibre passes.

The strain means preferably comprises a metallic filament forming part of the cable and being secured to the interior of the cylindrical member.

The further strain means may comprise a tube member surrounding the or each optical fibre and secured to the diaphragm.

According to a further aspect of the invention the or each optical fibre is removably mounted within the diaphragm, and guide means are provided between the diaphragm and the cable whereby the or each optical fibre can be withdrawn and replaced without dismantling the housing.

Figure 4:
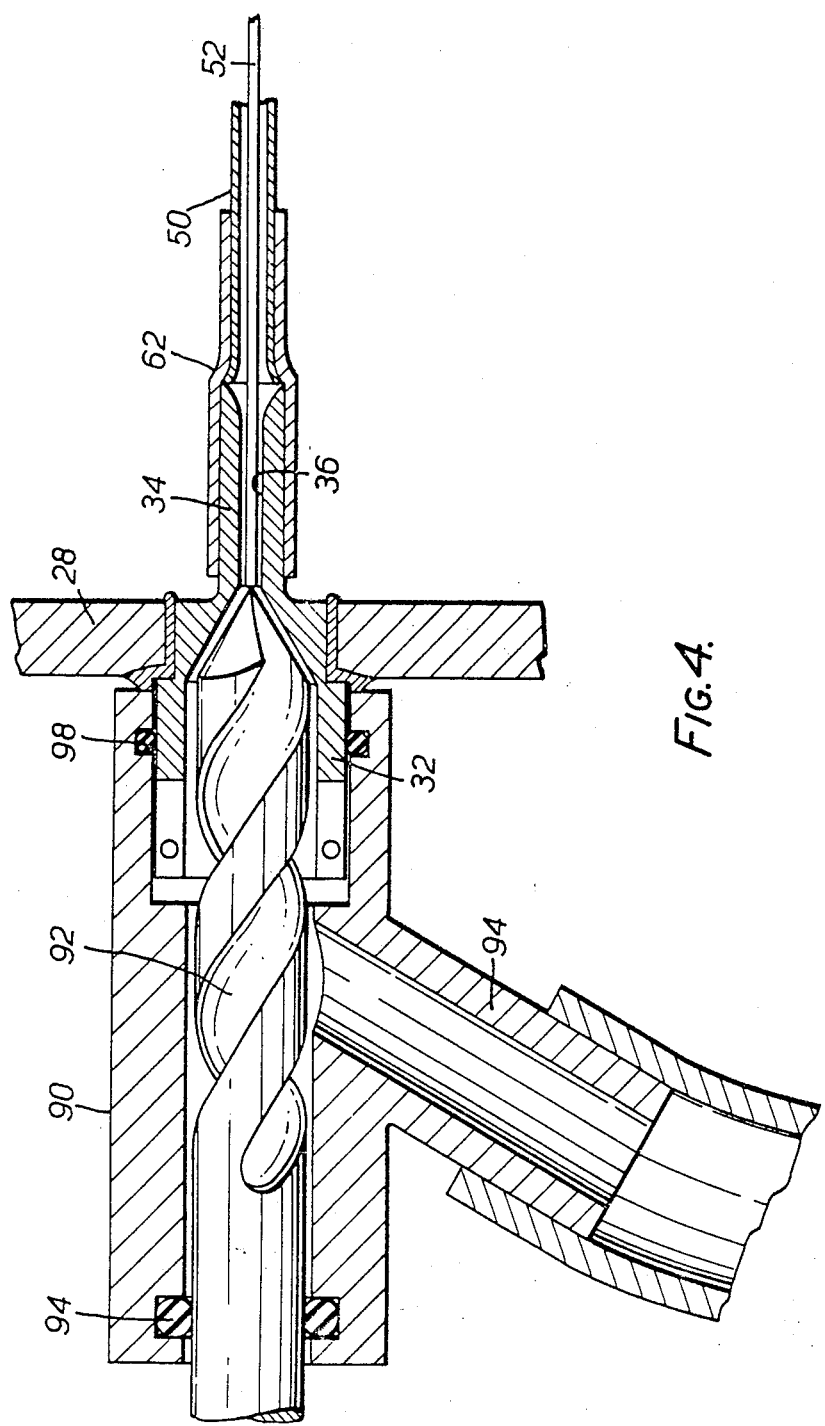

Further aspects of the invention will become apparent from the following description of embodiments of the invention given by way of example only with reference to the accompanying drawings in which:

FIG. 1 is cross-sectional view of a connector for a sealed cable containing four optical fibres according to the invention, FIG. 2 is an enlarged view of a portion of the connector shown in FIG. 1, FIG. 3 is an exploded perspective view of the portion shown in FIG. 2, FIG. 4 illustrates a method of removing an optical fibre from the portion shown in FIG. 2, and FIGS. 5, 6, 7, 8 and 9 illustrate alternative arrangements of the portion of the connector shown in FIG. 2.

The connector consists of a cylindrical body 10, to one end of which is secured a collar 12. The collar 12 is formed with a screw thread on which is mounted a nut 14, and located within the end of the collar 12 is a resilient grommet 16 which is intended to grip an optical cable 18. To the other end of the cylindrical body 10 is bolted a flange member 20 and rigidly clamped between the body 10 and the flange member 20 is a strain bar 22. A resilient 'O' ring 24 between the body 10 and the flange member 20 seals this joint. Bolted inside the flange member 20 by a nut 26 is a diaphragm 28, again with an 'O' ring 30 to seal the joint.

The diaphragm 28 is provided with four sleeves 32, (only two of which are shown in FIG. 1), each sleeve being provided with a projection 34 which extends through the diaphragm 28, and each sleeve 32 being provided with a fine hole 36 which also extends through the projection 34. One of these sleeves and part of the diaphragm 28 is shown in more detail in FIG. 2.

The diaphragm 28 also has formed through it four further holes through which metal conductors 38 pass, these conductors being located in the diaphragm by glass-to-metal seals. A strut 40 is also secured to the outside surface of the diaphragm 28 which serves as a strain reliever for electrical wires mentioned hereinafter.

The connector assembly is intended to be secured to a repeater box, a side 42 only of the repeater box being shown, and for this purpose the flange member 20 is provided with an external screw thread so that the connector assembly can be bolted to the side 42 by means of a nut 44 inside the repeater box. A further 'O' ring 46 seals the joint between the side 42 and the flange member 20.

The optical cable 18 consists of a central high tensile steel strain wire 48 around which are arranged four tubes 50 each carrying a single filament optical fibre 52. In between the four tubes 50 are four insulated copper wires 54 for supervisory electrical signals. Surrounding the parts 48, 50 and 54 is a tubular extension of polythylene and then a helical band of kraft paper followed by an aluminum foil wrapped and continuously welded to form a water barrier known in the art as the "Glover Barrier". Finally an external tube of polyethylene is extruded to form the outer sheath of the cable.

The end of the cable 18 is stripped of the outer sheath and the Glover Barrier for a length sufficient to permit the optical fibres to pass through the nut 14 and the collar 12, and a flange 56 is formed on the end of the polyethylene outer sheath of the cable 18. The flange 56 is preferably made from an epoxy resin moulded in position on the outer sheath of the cable 18 and prevents the cable from being pulled out of the connector. The nut 14 is tightened to barrel the grommet 16 and form a pressure-tight seal between the connector and the cable.

The strain wire 48 is terminated adjacent to the strain bar 22 and clamped thereto by a screw 58. The copper wires 54 are separated from the tubes 50 and these are all fed past the strain bar 22 to the diaphragm 28. The optical filaments are fed through the fine holes 36 through the sleeves 32 and bonded into the sleeves by an epoxy resin seal 60. The tubes 50 are terminated adjacent to ends of the projections 34 and sealed thereto using a length of heat shrink tubing 62. The copper wires 54 are soldered on to the projecting ends of the metal conductors 38.

After passing through the sleeves 32 each of the optical fibres 52 are sleeved with a special cable 64 with a nylon inner tube 68 and three "Kevlar" (Registered Trade Mark) strain filaments 66 which are spaced at 120 degress intervals around the nylon tube and are bonded to a polypropylene outer jacket 70. The cable 64 is mechanically anchored to the diaphragm 28 so that the external strains imposed in handling the cables 64 are not transmitted to the optical filaments 52. The mechanical anchorage consists of a clip 72 crimped tightly around the cable 64, a short metal sleeve 74 inside the cable 64 preventing collapse of the cable during the crimping operation. Lugs 76 are formed on the clip 72 during the crimping operation, and these are adapted to fit into axial slots 78 formed in each of the sleeves 32. Pins 80 fitted into holes 82 formed through the sleeve 32 at the ends of the slots 78 hold the lugs, and hence the cable 64 in position to withstand tensile and rotative forces on the cable 64. The end of the cable 64, and the sleeve 32 are finally covered with a length of heat shrink tube 84 to seal the joint and to help to retain the pins 80.

Further conductive wires 86 are soldered to the outer ends of the metal conductors 38 and these are anchored to the strut 40 by suitable clips 88 to prevent strain on the joints between the further conductive wires 86 and the metal conductors 38.

It will be seen that the connector is completely sealed against the ingress of dirt and moisture and as a further precaution the cable 18 and the interior of the body 10 in use is pressurized to about 8 p.s.i. Furthermore the optical fibres are protected from strain on both sides of the diaphragm 28.

If an optical fibre breaks, either outside the connector or inside the connector, the whole fibre can be replaced without dismantling the connector. The method is illustrated in FIG. 4.

The connector must be removed from the repeater box and the outer cable 64 removed from the broken fibre. Any fibre 52 projecting from the sleeve 32 is broken off and an adaptor 90 fitted over the end of the sleeve 32. A suitable sized drill 92 is used to drill out the epoxy resin seal 60 while a vacuum pump (not shown) draws away the debris through a sidepipe 94 forming part of the adaptor.

Resilient 'O' rings 94 and 98 seal the adaptor to the drill shank and the sleeve 32 respectively whilst the epoxy resin seal 60 is drilled out.

After drilling is completed, the fibre 52 can be drawn out, and a replacement fibre fed up through the cable 18 and through the sleeve 32. A new epoxy resin seal 60 is made, and the cable 64 and its anchorage reassembled. To facilitate the passage of the fibre through the sleeve 32, the end of the fine hole 36 is countersunk.

Various modifications may be made to the connector without departing from the scope of the invention. Thus FIGS. 5 to 9 illustrate different methods of sealing the fibres 52 to the diaphragm 28, although in these cases the fibres are not removable without dismantling the connector.

Figure 5:
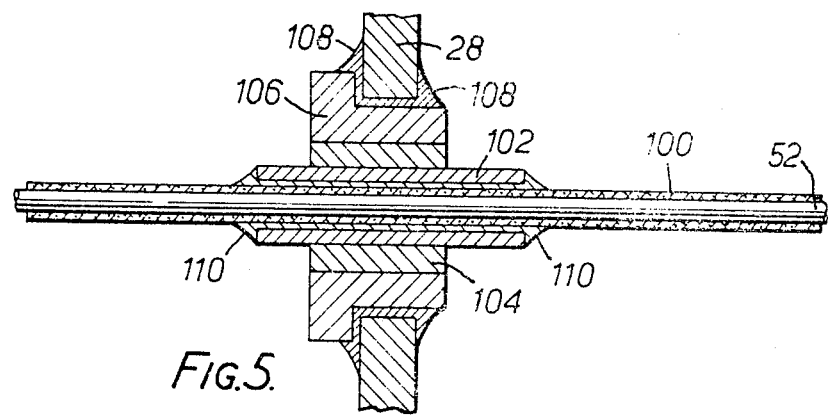

FIG. 5 shows a cross-section of a fibre 52 which has been electroplated with a continuous metallic coating 100. The fibre 52 is pushed through a tube 102 which forms part of a glass-to-metal seal consisting of an annular glass or ceramic insulator 104 and a metallic housing 106. A hermetic seal is formed between the diaphragm 28 and the housing 106 by solder 108 and between the coating 100 and the tube 102 by solder 110. In this case the coating 100 is electrically conductive and could be used instead of the copper wires 54.

Figure 6:
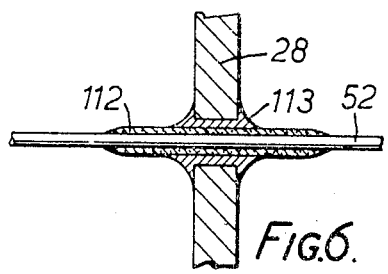

In FIG. 6, the optical fibre 52 has a local electroplated metallic coating 112, and the fibre is pushed through a hole in the diaphragm 28 and sealed with solder 113.

Figure 7:
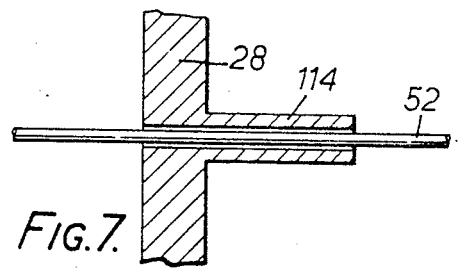
Figure 8:
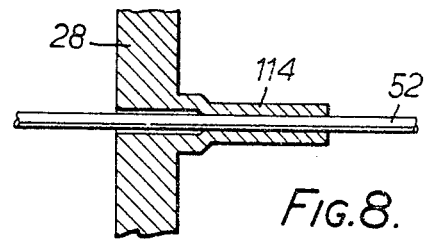

FIG. 7 illustrate a diaphragm 28 formed with a sleeve 114 which is thermo melted by direct heat and pressure ultrasonic means to form a hermetic seal as shown in FIG. 8. This method can be used with the optical filaments 52 and the copper wires 54 and in this case the diaphragm 28 and the sleeve 114 can be moulded in a suitable plastics material.

Figure 9:
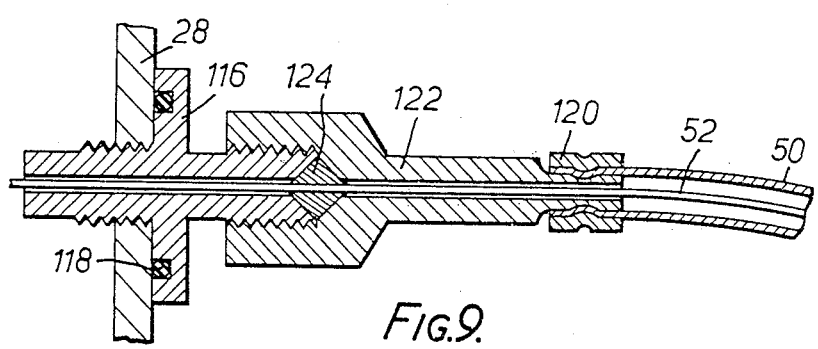

In FIG. 9 the optical fibre 52 passes through the diaphragm 28 which is threaded to accept a body 114 and an 'O' ring seal 118 is compressed when the body 116 is screwed home. The body 116 could alternatively be soldered on to the diaphragm 28, or it could be moulded from a suitable plastic material integrally with the diaphragm 28 as in FIG. 7. The tube 50 is crimped by a collar 120 to a sleeve screw 122 which is screwed to the body 116. A moulded elastomeric cone grommet 124 is compressed on to the fibre 52 as the sleeve screw 122 is tightened, thus making a hermetic seal.

In each of these cases a continuous optical fibre is used in the connector, no joints between optical fibres being used, and thus, there is no loss of light transmitted along the optical fibres except the losses normally encounted in a continuous fibre.

I claim:

1. A connector for removably connecting the end of a cable to a hollow member, said cable comprising a plurality of optical fibres, each of said optical fibres being contained within a hollow tube, said connector comprising a housing sealingly connected to said end of said cable and a wall member sealing the end of said housing, said hollow tubes terminating and being sealingly attached to said wall member over holes formed through said wall member for the passage therethrough of said optical fibres, means for securing and sealing said optical fibres within said holes, said cable containing a strain filament, said strain filament being secured inside said housing to protect said optical fibres from tensile stress within said housing, said cable and said housing being pressurized and said pressure being maintained when said connector is removed from said hollow member.

2. A connector as claimed in claim 1, wherein said means for securing and sealing said optical fibres within said holes in said wall member is removable to permit removal of said optical fibres from said hollow tubes without said pressure being lost in said cable and said housing.

3. A connector as claimed in claim 2, wherein said means for securing and sealing said optical fibres within said holes comprises a thermosetting resin.

4. A connector as claimed in claim 1, further comprising strain means located between the end of each optical fibre outside said housing and said wall member for providing protection against tensile stress.

5. A connector as claimed in claim 4, wherein said strain means comprises a plurality of sleeve members, each said sleeve member surrounding one optical fibre and being secured to said wall member.

* * * * *